United States Patent [19]
Kempson et al.

[11] 3,788,063
[45] Jan. 29, 1974

[54] HYDRAULIC APPARATUS

[75] Inventors: Bertram Carl Kempson, Merioneth;
James Andrew Nicholls,
Cheltenham, both of England

[73] Assignee: Dowty Hydraulic Units Limited,
Cheltenham, England

[22] Filed: July 3, 1972

[21] Appl. No.: 268,906

[52] U.S. Cl............................ 60/19, 60/431, 60/449, 60/906
[51] Int. Cl............................................ F02b 41/00
[58] Field of Search ....... 60/19, 423, 428, 431, 449, 60/486, 487, 906; 180/6.48, 66

[56] References Cited
UNITED STATES PATENTS

| | | | |
|---|---|---|---|
| 2,516,662 | 7/1950 | Vickers et al...................... | 60/431 X |
| 3,003,309 | 10/1961 | Bowers et al. ..................... | 60/431 X |
| 3,065,700 | 11/1962 | Blenkle.............................. | 60/486 X |
| 3,284,999 | 11/1966 | Lease................................... | 60/431 |
| 3,371,479 | 3/1968 | Yapp et al. ........................... | 60/431 |
| 3,500,633 | 3/1970 | Livezey.................................. | 60/19 |

*Primary Examiner*—Edgar W. Geoghegan
*Attorney, Agent, or Firm*—Young and Thompson

[57] ABSTRACT

This invention relates to a control system for an engine arranged to drive a load through a smoothly variable speed ratio transmission. A speed responsive member movable in accordance with engine speed operates jointly to adjust fuel flow to the engine and to control the speed ratio of the transmission. For a predetermined range of engine speeds over which the speed responsive member adjusts fuel flow to the engine to tend to maintain speed within the range the transmission is maintained at a fixed speed ratio. When the engine speed drops below a predetermined speed the speed responsive member operates to reduce speed ratio in accordance with reduction of engine speed below the predetermined speed. The predetermined range of speeds, the predetermined speed and the fixed speed ratio may each be separately adjustable.

The invention may be applied to the propulsion of a vehicle such as a crawler tractor having spaced ground engaging elements individually driven by two variable speed ratio transmissions from a single engine. The speed ratios may be separately adjustable and the speed responsive member on the engine may operate jointly on the speed ratios when the speed falls below the predetermined speed to reduce the speed ratios, maintaining the selected steering proportionality between the speed ratios as they are reduced. In this way any selected steering path for the vehicle is maintained during speed ratio reduction by the engine speed responsive member.

18 Claims, 7 Drawing Figures

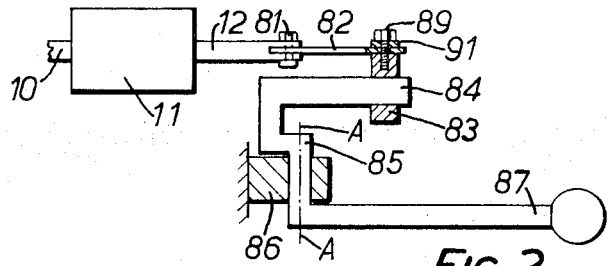
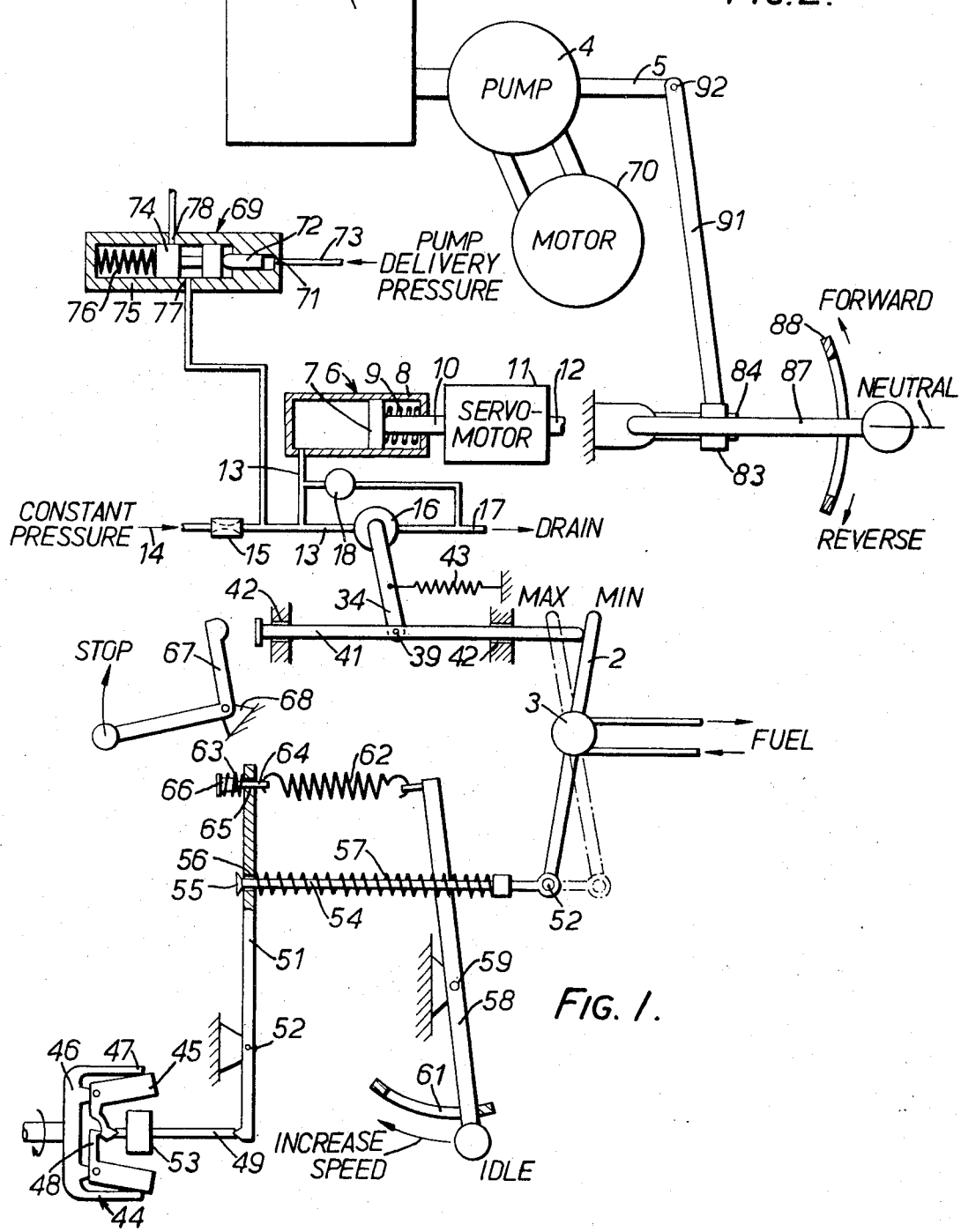
FIG. 2.
FIG. 1.

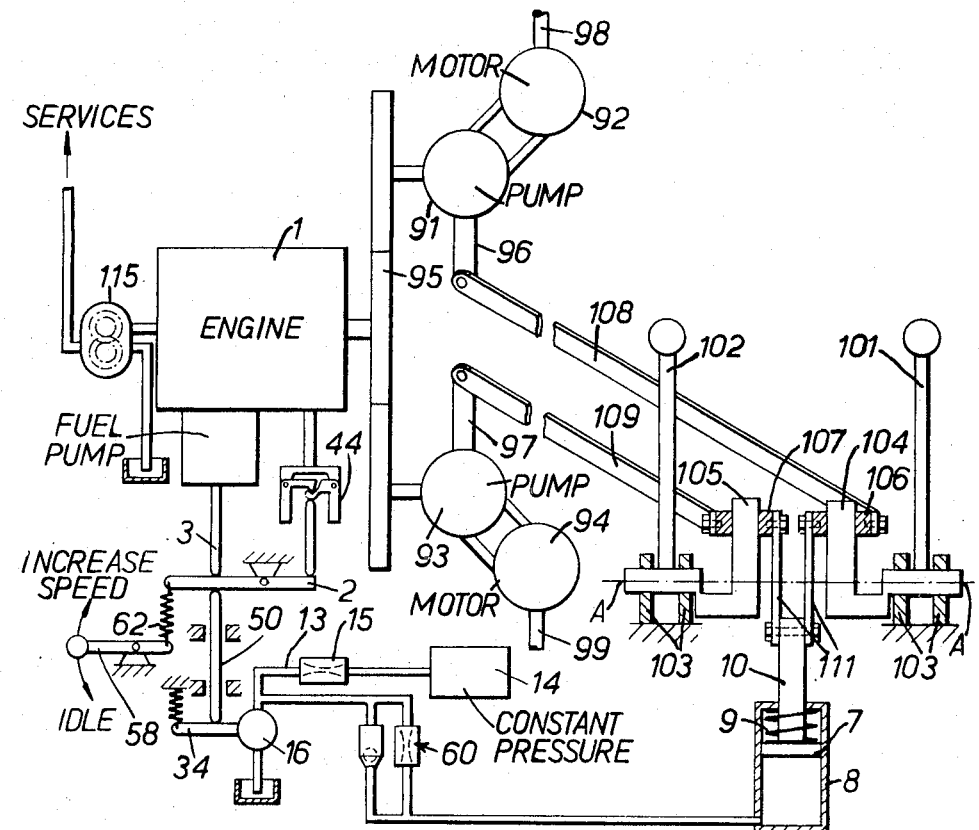
FIG. 3.
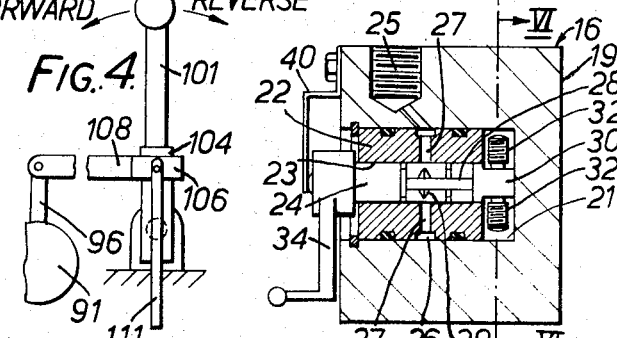
FIG. 5.
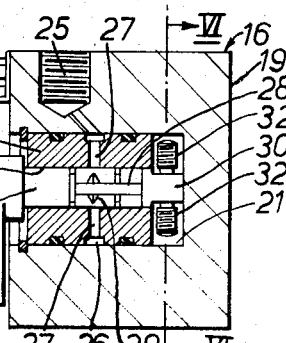
FIG. 4.
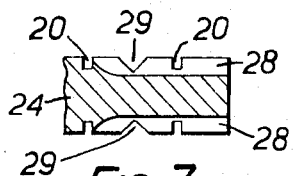
FIG. 7.
FIG. 6.

HYDRAULIC APPARATUS

This invention relates to a control system for an engine arranged to drive a load through a smoothly variable speed ratio transmission. Where there may be a large variation of load on the engine, whether or not the total load is exerted through the transmission, the variation in engine driving torque offered by adjustment of fuel flow to the engine may not be sufficient to cater for the large variation in the load. If the load increases and demands an engine torque greater than can be provided at maximum fuel flow to the engine, the engine will stall. In many kinds of vehicle, such for example as an earth moving vehicle, where the engine is subjected to continuously varying loads near to and beyond the torque capability of the engine it is known to provide a smoothly variable speed ratio transmission to transmit power from the engine for vehicle propulsion. Nevertheless, an earth moving vehicle will suffer frequent engine stalls during operation because variation of the propulsion load can occur more quickly than the transmission can be adjusted. It is well known to provide hydro-dynamic torque converters to transmit engine power on these vehicles, which by their characteristics are not able to cause engine stall whilst transmitting substantial power. Nevertheless, hydro-dynamic converters are mechanically inefficient and their use demands large engines and high fuel consumption.

The present invention has for its object to provide a control system for an engine arranged to drive a load through an efficient smoothly variable speed ratio transmission, which is able to provide over-riding control of the speed ratio during use to avoid engine stall.

In accordance with the present invention a control system for an engine arranged to drive a load through a smoothly variable speed ratio transmission includes an engine speed responsive member whose position is determined by engine speed, a fuel flow member for the engine adjusted by movement of the speed responsive member in the sense to increase fuel flow to the engine when engine speed decreases and vice versa to tend to maintain engine speed within a predetermined range, and speed ratio control means for the transmission normally maintaining the speed ratio at a fixed value for engine speeds above a predetermined speed and variable by the speed responsive member to reduce speed ratio for engine speeds below the predetermined speed such that each speed below the predetermined speed has a corresponding speed ratio, said predetermined speed lying within or below the predetermined range.

For preference the predetermined speed is the lowest speed in the predetermined range. By this invention engine fuel flow is adjusted in dependence on the load exerted on the engine within the predetermined range of speeds in accordance with conventional speed governor arrangements, but, when the load on the engine is increased to a value at which fuel flow to the engine can no longer be increased to cater for the load, the invention avoids engine stall by providing a stable reduction of speed ratio of the transmission, the reduction in speed ratio being in accordance with the reduction of speed below the predetermined speed. Since the transmission is an efficient transmission the engine may thus be operated at maximum or near maximum fuel flow with stability of speed ratio control and without substantial risk of engine stall.

The predetermined range of engine speed, the position of the predetermined engine speed relative to the predetermined range of engine speed, and the fixed value of the speed ratio may be adjustable.

Two embodiments of the invention will now be described with reference to the accompanying drawings, in which FIG. 1 is a diagrammatic illustration of the first embodiment, FIG. 2 illustrates a detail of FIG. 1, FIG. 3 diagrammatically illustrates the second embodiment of the invention, FIG. 4 illustrates a detail of FIG. 3 and FIGS. 5, 6 and 7 are cross-sections through the variable throttle device employed in both FIGS. 1 and 3, FIG. 6 being a cross-section on line VI—VI of FIG. 5.

Reference is made initially to FIGS. 1 and 2. The engine 1 is a conventional diesel engine and is connected to transmit power through a transmission comprising a variable-positive-displacement pump 4 whose displacement is adjusted by the angular setting of a lever 5.

A conventional injector fuel pump is provided capable of injecting a quantity of fuel per revolution of the engine and is adjustable by the angular setting of a fuel lever 2 acting on a rotary restrictor valve 3. In this conventional fuel pump the restrictor valve 3 forms the fuel flow member of the engine and controls fuel flow from a pressure source into a conventional reciprocating piston device mechanically reciprocated in synchronism with engine rotation such that the fuel permitted to flow through the restrictor valve is pressurised by the piston device for injection into the engine. The piston device is arranged to have a maximum stroke corresponding to maximum fuel injection per revolution of the engine. If the restrictor valve is adjusted to a position tending to allow a greater fuel flow the flow will be limited by the piston device. In the drawing the maximum and minimum positions are shown for the lever 2 and in operation irrespective of the operating speed of the engine movement of the lever 2 beyond the maximum position will not cause an increase in fuel flow per revolution of the engine.

A flyweight assembly 44 driven by the engine comprises a plurality of flyweights 45 mounted on a rotary platform 46 driven by the engine. Fixed extensions 47 carried by the platform 46 form stops on radial outward movement of the flyweights 45. Levers 48 from the flyweights act on a push rod 49 disposed coaxially with the rotation axis of the platform 46, and radial movement of the flyweights is transformed into axial movement of the push rod 49 which latter engages a lever 51 pivotally mounted at a fixed fulcrum 52. The push rod 49 carries an enlargement 53 located between the flyweights 45 to form a stop for inward movement of these flyweights.

The lever 51 is connected to the lever 2 by means of a link 54 which has a head 55 engaging loosely in a hole 56 in lever 51, a pivot connection 52 on the lever 2 and a light compression spring 57 mounted on the link 54 to engage lever 51. Lever 2 forms the engine speed responsive member.

A manually adjustable speed control lever 58, pivotally mounted at fixed fulcrum 59, moves in a gate 61 to vary the spring tension applied to lever 51 through a pair of springs 62 and 63. The spring 62 is a tension spring of high rate connected in series with the compression spring 63 of low rate by means of a link 64 extending through a hole 65 in lever 51. The compression permitted for the spring 63 is limited by a shoulder 66 on link 64 which makes contact with lever 51. For idling speeds of the engine, the tension in the spring assembly 62, 63 is low and the low rate of spring 63 is then operative on lever 51. For higher engine speeds greater tension is applied to the spring assembly by lever 58 and shoulder 66 will engage lever 51 so that the high rate spring 62 is solely operative on lever 51.

A stop lever 57 mounted on a fixed fulcrum 68 may engage one end of a rod 41 suitably mounted in bearings 42 for sliding movement to urge fuel lever 2 in the clockwise sense as seen in the drawing to shut off fuel to the engine in order to stop the engine.

A variable throttle valve 16 is provided with a lever 34 pivotally connected to the rod 41 at connection 39, a tension spring 43 connecting between lever 34 and a fixed abutment and acting through the lever 34 to urge rod 41 into contact with lever 2.

The variable throttle valve 16 is fed with liquid from a constant pressure source 14 through a fixed throttle 15, the pipe 13 forming the junction between the fixed throttle and the variable throttle valve. From the variable throttle valve 16 liquid flows through pipe 17 to drain.

The pressure within junction pipe 13 will thus vary in accordance with the flow rate of liquid permitted from the fixed throttle 15 by the variable throttle valve 16 and in turn this will depend on the position of the lever 34. The variable pressure in pipe 13 is fed into one end of a cylinder 8 to act on a piston 7 within the cylinder. An opposing force is applied to the piston 7 by a compression spring 9 located within the cylinder, the position taken up by the piston being determined by the actual pressure fed to the cylinder by the pipe 13. The piston rod 10 extending from the piston 7 operates the control valve of a servomotor 11 whose output member 12 is connected for adjustment of the lever 5 to determine transmission pump displacement. The function of the servomotor 11 is to cause movement of the output member 12 in exact agreement with movement of the piston rod 10 but with considerably greater force. Any conventional source of power may be fed to the servomotor 11 for operation thereof.

The output member 12 is pivotally connected at 81 to a link 82 which extends to a slider 83 carried on a lever 84. The lever 84 is carried by a shaft 85 mounted within a fixed support 86 for movement about an axis A—A. A manually operable lever 87 extends from the shaft 85 for movement within a gate 88. The central position of lever 87 within gate 88 is the neutral position and in this position the link 82 extends approximately parallel to the lever 84 to ensure that over the limited angular movement of lever 84 movement of the piston 7 can cause corresponding movement of slider 83 along lever 84 down to a limiting position at which the axis A—A intersects the slider 83.

The link 82 is pivotally connected to the slider 83 at connection 89, and connection 89 also is the pivotal connection of another link 91 on to the slider 83. The link 91 extends to a pivotal connection 92 with the lever 5 controlling displacement of pump 4 and is of sufficient length so that in the neutral position of lever 84 the link 91 lies approximately at right angles to lever 84 over the range of movement of slider 83.

Reference is now made to FIGS. 5, 6 and 7 of the accompanying drawings to illustrate the structure of the valve 16. This valve comprises a body 19 having a bore 21 within which a rotary sleeve 22 is mounted. The sleeve itself includes a coaxial bore 23 containing the rotary plug 24 of cylindrical shape. A screw-threaded connection 25 is arranged to connect from pipe 13 to a groove 26 formed around the plug 24. A transverse bore passing diametrically through the plug forms a pair of ports 27 opening into the bore 23, these ports connecting to a groove 26 and thus being fed with liquid at pressure from connection 25. The end of the plug 24 co-operating with the ports 27 is shown in greater detail in FIG. 7. This end of the plug is formed with a pair of opposed milled slots 28 each of which is intersected by a V-section groove 29 so that rotation of the plug 24 varies the degree of over-lap between each of the grooves 29 and the port 27. A pair of circumferential grooves 20 are located in the plug one on either side of grooves 29 and are intersected by the grooves 28. The function of grooves 20 is to limit the area of pressure spread in bore 23. A further screw-threaded connection 31 connects the inner end of bore 21 to drain. The lever 34 is secured to the outer end of plug 24 for angular adjustment of the plug and variation of the throttle effect between the connections 25 and 31. Leaf spring 40 lightly retains plug 24.

The position at which the ports 27 just begin to open to the grooves 29 may be adjusted relative to the lever 34 by slight angular adjustment of the sleeve 22 within bore 21. This adjustment is obtained by providing a diametrical flange 30 on the inner end of the sleeve 22 and a pair of screws 32 threaded within the body 19 to engage oppositely on the flange and lock it in a desired preset position. The screws 32 have internal hexagon sockets for adjustment by a suitable key insertable through the screw-threaded bores 33 containing screws 32. After adjustment the ends of the screw-threaded bores 33 may be closed by screw-threaded plugs 37.

In order to prevent the delivery pressure from pump 4 rising above a maximum safe value a pressure responsive device 69 is provided. This device includes a small diameter bore 71 within which a plunger 72 is slidable, pump delivery pressure being fed to the bore 71 through a pipe 73. A plunger 72 reacts against a piston valve 74 mounted within a larger bore 75 coaxial with the bore 71. A spring 76 within bore 75 reacts on the piston valve 74. A pair of ports 77 and 78 are located within the bore 75 being connected respectively to the pipe 13 and to drain. For pump delivery pressures lower than a predetermined maximum the spool valve 74 will prevent flow between the ports 77 and 78. If however the delivery pressure exceeds the predetermined value the piston valve 74 will move against a spring 75 to open a flow path between ports 77 and 78 thus venting the pipe 13 and cylinder 8 so that the spring 9 therein may move the piston 7 fully to the left as seen in FIG. 1. Such movement will carry the slider 83 along lever 84 to a position where the pivotal connection 89 is coaxial with axis A—A and in this position, quite irrespectively of the angular location of lever 84, link 91 will hold the pump 5 in its zero displacement position. In normal circumstances the occurrence of pump delivery pressure greater than the predetermined value will cause movement of the piston 72 to the left as seen in the drawing only to the extent that a reduction of pump displacement is obtained which lowers pump delivery pressure below the predetermined value.

For normal operation of the control system described the engine 1 is assumed to be rotating and transmitting a driving torque to the pump 4 which is delivering liquid at pressure to a suitable load, in this case provided by a hydraulic motor 70 which is mechanically connected to a variable load. The engine will rotate the governor assembly 44 and assuming that a steady constant speed has been reached the flyweights 45 will be in steady positions intermediate the stops 47 and 53 selecting an angular position for the fuel lever 2 to determine a particular fuel flow per revolution of the engine. The lever 34 will be moved by the rod 41 and lever 2 to adjust the variable throttle valve 16. Depending on operating conditions the valve 16 may permit a throttled flow of liquid through fixed throttle 15 to determine an intermediate pressure in the pipe 13 which will act against the spring 9 to determine an intermediate displacement position for the piston 7.

In controlling fuel flow to the engine, the fuel will be adjusted by means of a governor assembly 44 and valve 3 so that as the engine speed increases the fuel flow per revolution will reduce, or alternatively as engine speed reduces the fuel flow per revolution will increase. The relation between engine speed and the resulting fuel flow to the engine, assuming a fixed position for the speed lever 58, is normally referred to as governor droop and in this embodiment assuming the lever 58 to be in its maximum speed position the engine speed at its maximum may be 2,500 r.p.m. and may fall to 2,300 r.p.m. for the fuel flow to rise from a minimum to a maximum. The movement available for the flyweights 45 is sufficiently large that it is capable of moving the lever 2 beyond the position corresponding to maximum fuel flow when the speed drops below 2,300 r.p.m. Movement of the lever 2 in adjusting fuel flow will also adjust lever 34 of valve 16 and depending on the setting of the sleeve 22 within valve 16 flow of liquid from the constant pressure source 14 through throttle 15 may start at a predetermined speed, flow through the variable throttle valve 16 then increasing as the speed drops further. Increase in flow through the valve 16 will smoothly reduce pressure in junction pipe 13 and in cylinder 8 so that the spring 9 may smoothly move piston 7 to the left as seen in the drawing, for each value of reduced pressure in the cylinder there being a corresponding position for the position for the piston 7, i.e., the position of the piston 7 is in accordance with the reduction in pressure in the cylinder 8.

The increased load applied to the engine to cause the droop in engine speed will have been applied to the engine firstly by the selection of displacement for the pump 4 by movement of lever 87 in the forward or reverse direction and secondly by the load driven by the motor 70 rising to a substantial value. Movement of the piston 7 when the engine speed has dropped below the predetermined speed will move the slider 83 along the lever 84 towards axis A—A, thus drawing the position of the displacement selecting lever 5 nearer to the zero displacement position. This will reduce the torque demanded by the pump from the engine. The reduction in pump displacement will substantially in accordance with the reduction of engine speed below the predetermined value and for preference the reduction in pump displacement is in direct proportion to the reduction in engine speed below the predetermined speed.

The combination of the pump 4 and the motor 70 forms a hydraulic power transmission of high efficiency whose speed ratio is in direct proportion to the displacement of pump 4 as selected by the lever 5. A further method of varying speed ratio may be obtained by arranging that the motor is also of variable displacement, sequential adjustment of the pump and motor displacements being arranged to obtain continuous variation of speed ratio.

Within the scope of the present invention the variable displacement pump 4 may on its own be considered as a smoothly variable speed ratio transmission, the input being the rotational speed driving the pump and the output being the delivery flow rate of liquid from the pump. The speed ratio is thus the ratio between the pump driving speed and the delivery flow rate of liquid. In such a case the load would necessarily be a hydraulic load. Where the transmission is a conventional transmission as shown having a variable displacement pump 4 and a fixed displacement motor 70 the speed ratio is the ratio between the pump driving speed and the motor driving speed.

The relation between the predetermined speed and the selected speed range is adjustable by adjustment of the sleeve 22 in valve 16. In order to obtain the most effective use of the engine it is normally arranged that the predetermined speed is either the lowest speed of the predetermined speed range or very slightly below this lowest speed in order to ensure that the engine must exert its maximum driving torque before reduction of speed ratio of the transmission occurs. It is, however, within the scope of this invention to arrange that the predetermined speed lies within the predetermined speed range so that reduction of speed ratio can occur before the lowest speed in the predetermined range is reached as load on the engine is increased.

The predetermined speed range is selectable by the speed lever 58 and the fixed setting of the speed ratio is adjustable by means of the lever 87. Having set the lever 87 at a particular position corresponding to a desired fixed speed ratio the application of an increased load to the engine and the subsequent reduction of speed ratio remains in proportion to the reduction of engine speed below the predetermined value, the actual proportionality between reduction of speed ratio and reduction of speed below the predetermined speed being dependent on the fixed speed ratio selected by lever 87.

Reference is now made to FIGS. 3 and 4 of the accompanying drawings. Similar parts already referred to in FIGS. 1 and 2 will receive similar reference numerals. The embodiment in FIGS. 3 and 4 is intended for the propulsion of a tractor having a pair of caterpillar tracks separately driven from the engine 1 through a pair of separate hydrostatic transmissions. These transmissions comprise, firstly, the pump 91 and motor 92 and secondly, the pump 93 and motor 94. The two pumps are mechanically driven from the engine 1 through a suitable gear train 95 arranged to drive the pumps 91 and 93 at similar speeds. The displacements of the pumps 91 and 93 are adjustable respectively by levers 96 and 97 from a zero displacement position in either a forward or a reverse direction. Each pump is conventionally connected in a closed hydraulic circuit with its motor and the speed ratio of each transmission is the ratio of pump speed to motor speed. The two motors 92 and 94 are mechanically connected to drive the two caterpillar tracks of the tractor through output shafts 98 and 99. For each transmission the speed ratio is in direct proportion to pump displacement.

A pair of manually operable control levers 101 and 102 are provided for operation by the driver. These two levers are pivotally mounted in fixed bearings 103 for movement about a common axis A—A. Each of the levers 101 and 102 has a stub lever respectively 104 and 105 fixedly secured thereto and each stub lever has respectively a slider 106 and 107 mounted thereon. From the slider 106 a link 108 extends to the lever 96 and from the slider 107 a link 109 extends to the lever 97. The links 108 and 109 are long compared with the levers 104 and 105 and in the neutral positions of levers 104 and 105 the links extend substantially at right angles to these levers irrespectively of the positions of the sliders on their levers.

The position of each slider 106 and 107 on its stub lever is adjustable by means of a further pair of links 111 pivotally connected to the piston rod 10 extending from piston 7. Piston 7 is mounted within cylinder 8 and is loaded by a spring 9 such that in the absence of hydraulic pressure within the cylinder 8 the spring will move sliders 106 and 107 along the stub levers to a position where the pivotal connections of the links 108 and 109 to the sliders lies on the axis A—A. The action of liquid at pressure in the cylinder 8 will urge the sliders away from the axis A—A. A servomotor may be associated with the piston rod 10 as shown in FIG. 1 to amplify the force available from piston 7 to move the sliders 106 and 107.

The engine includes a conventional fuel injection pump adjusted by a valve member 3. A flyweight device 44 driven by the engine reacts on a pivoted lever 2 forming the speed responsive member. Lever 2 is adjustably loaded by spring 62 and a manual speed control lever 58. Lever 2 engages the valve member 3 to adjust fuel flow to the engine. The variable throttle valve 16 is adjusted by lever 34, rod 50 and lever 2 to control liquid flow from the constant pressure source 14 through the fixed throttle 15 to drain. The pipe 13 connecting throttle 15 to throttle valve 16 is connected through a parallel restrictor and non-return valve combination 60 to the cylinder 8, so that piston 7 can reduce speed ratio more quickly than it can increase speed ratio.

The structure of valve 16 is as illustrated in FIGS. 5, 6 and 7.

The engine 1 is also connected to drive a fixed positive-displacement service pump 115 for feeding one or more auxiliary power driven devices carried on the tractor such for example as a power driven shovel.

In use the engine will drive the three pumps 91, 93 and 115 and its speed range is set by lever 58. Within this predetermined range the flyweight device 44 acting on lever 2 will adjust fuel flow from a minimum at the highest speed in the range to a maximum at the lowest speed in the range. The maximum fuel flow position for the valve 3 is the same irrespective of engine speed, i.e., it corresponds to a predetermined flow rate per revolution of the engine. At this maximum position for lever 2 the valve 16 is just about to open. For speeds within the predetermined range selected by lever 58 the throttle valve 16 is closed and the maximum pressure for the source 14 is fed to cylinder 8 to push sliders 106 and 107 to the upper ends of their stub levers. The driver may then fully adjust the two pumps 91 and 93 by movement of levers 101 and 102 for speed adjustment and steering of the tractor. When the total load on the engine increases to cause speed to drop to the predetermined speed the valve 16 will start to open to reduce pressure in pipe 13 so that spring 9 moves sliders 106 and 107 towards the axis A—A thus reducing the selected displacement of the pumps 91 and 93 and reducing the load on the engine to avoid stall.

The steering of the vehicle is determined by the relative angular positions of levers 101 and 102 and it will be seen since the sliders 106 and 107 are pulled similarly towards the axis A—A by piston 7, that reductions of the selected displacements of pumps 91 and 93 retain the selected proportion to one another, i.e., the proportionality for steering as selected by levers 101 and 102. Thus any selected steering path for the tractor is substantially maintained when the throttle valve 16 causes reduction of the transmission speed ratios. The shape of each groove 29 is so arranged that drop in the pressure in pipe 13 is in proportion to drop in engine speed below the predetermined speed. This reduction in pressure is fed to cylinder 8, and spring 9 by virtue of its spring rate will move piston 7 in proportion to the reduction of engine speed below the predetermined speed. Thus each transmission 91, 92 or 93, 94 for each engine speed below the predetermined speed has a corresponding speed ratio. These speed ratios will also depend on the selected positions of levers 101 and 102.

Whilst in the described embodiments the transmission comprises a variable displacement pump and a fixed displacement motor it is also within the scope of the present invention that the or each transmission could comprise:
a. a variable displacement pump and a variable displacement motor
b. a fixed displacement pump and a variable displacement motor
c. any other kind of smoothly variable speed ratio transmission such as a friction drive transmission.

Whilst in the illustrated embodiments the predetermined speed has been selected as the lowest speed in the predetermined range it will be appreciated that it is within the scope of the invention to arrange the predetermined speed to occur either within or just below the predetermined range. The predetermined speed range may be adjustably selected by the lever 58. The position of the predetermined speed relative to any predetermined range is determined by the setting of the sleeve 22 in the throttle valve 16.

We claim:
1. A control system for an engine arranged to drive a load through a smoothly variable speed ratio transmission including an engine speed responsive member whose position is determined by engine speed, a fuel flow member for the engine adjusted by movement of the speed responsive member in the sense to increase fuel flow to the engine when engine speed decreases and vice versa to tend to maintain engine speed within a predetermined range, and speed ratio control means for the transmission normally maintaining the speed ratio at a fixed value for engine speeds above a predetermined speed and variable by movement of the speed responsive member to reduce speed ratio for engine speeds below the predetermined speed such that each speed below the predetermined speed has a corresponding speed ratio, said predetermined speed lying within or below the predetermined range.

2. A control system as claimed in claim 1 including manually operable means for preset adjustment of said fixed speed ratio.

3. A control system as claimed in claim 2 wherein said manually operable means comprises a lever manually adjustable about a fixed axis, a slider adjustable along the lever, a first link extending from the slider to the transmission for speed ratio adjustment thereof, said link lying substantially at right angles to the lever in the neutral position of the lever, a second link extending from the slider in a direction substantially parallel to the lever in its neutral position and operative to move the slider along the lever, and means movable in response to movement of the speed responsive member for speeds below the predetermined speed to adjust the lengthwise position of the slider on the lever by means of the second link.

4. A control system as claimed in claim 3 wherein said means movable in response to movement of the speed responsive member comprises a variable throttle valve adjusted by movement of said speed responsive member, a fixed throttle in series with the variable throttle, a source of liquid at pressure connected to flow through the throttles and a spring loaded piston-and-cylinder unit hydraulically connected to the junction of the throttles and mechanically connected for adjustment of the second link in response to variable pressure at the junction resulting from adjustment of the variable throttle.

5. A control system as claimed in claim 1 including manually operable means for adjustment of the predetermined range of engine speed.

6. A control system as claimed in claim 5 including a centrifugal engine driven device and a manually adjustable spring acting in opposition to said centrifugal device to adjust the speed responsive member, said spring being adjustable by the manually operable means for adustment of the predetermined range of engine speed.

7. A control system as claimed in claim 1 including preset adjustment means to set the predetermined speed relative to the predetermined range of engine speed.

8. A control system as claimed in claim 7 wherein the means to reduce speed ratio comprises a variable throttle adjusted by movement of said speed responsive member, a fixed throttle in series with the variable throttle, a source of liquid at pressure connected to flow through the throttles, and a spring loaded piston-and-cylinder unit hydraulically connected to the junction of the throttles and mechanically connected for adjustment of the speed ratio, the said preset adjustment means comprising means for adjusting the variable throttle opening relative to movement of the speed responsive member.

9. A control system as claimed in claim 8 wherein the variable throttle comprises a body, a sleeve arranged for preset mounting in a bore in the body, a plug rotatably mounted within the sleeve, a lever interconnecting the plug with the speed responsive member, and co-operating ports in the plug and the sleeve forming the variable throttle the said preset adjustment means comprising angular adjustment means for the sleeve within the bore.

10. A control system as claimed in claim 9 including a pair of opposed ports in the sleeve co-operating with a pair of opposed ports in the plug such that opposed substantially equal radial forces act on the plug due to hydraulic pressure in the ports thus reducing frictional resistance to plug rotation to a very small value.

11. A control system as claimed in claim 3 for use with an engine arranged to transmit power through a pair of smoothly variable speed ratio transmission including a lever for each transmission both manually adjustable about a fixed axis, a slider adjustable along each lever, a pair of first links extending from the sliders one to each transmission for speed ratio adjustment thereof, said links lying substantially at right angles to their levers in their neutral positions, a second pair of links extending from the sliders in directions substantially parallel to the levers in their neutral positions and operative to move the sliders along the levers, said means movable in response to movement of the speed responsive member for speeds below the predetermined speed acting to adjust the pair of second links simultaneously for similar adjustment of the sliders along the levers.

12. A vehicle including an engine, a pair of smoothly variable speed ratio transmissions driven by the engine, a pair of laterally spaced ground engaging elements of the vehicle driven by the transmissions, and a control system as claimed in claim 11 for adjustment of the speed ratios of the transmissions.

13. For use in a vehicle having a pair of laterally spaced ground engaging elements, an engine, a pair of smoothly variable speed ratio power transmissions each having an input, an output, and a speed ratio control element, a gear train drivingly connecting the engine to drive the two inputs, the two outputs being arranged for connection one to each ground engaging element, a pair of control levers one for each transmission both being angularly adjustable about a common axis, a slider mounted on each lever, a first pair of links one pivotally connected to one slider and to one speed ratio control element and the other pivotally connected to the other slider and to the other speed ratio control element, each link being of substantial length between its pivotal connections to its associated slider and speed ratio control element and arranged so that angular movement of its associated lever may adjust the setting of the speed ratio control element, a second pair of links pivotally connected one to each slider, and engine over-load responsive means pivotally connected to the second pair of links and operative on occurrence of engine over-load to act through the second links to move the sliders towards the said common axis whereby to smoothly urge the speed ratio control elements towards zero speed ratio.

14. The combination as claimed in claim 13 including a pair of separate manually adjustable means connected one to each lever for individual angular adjustment thereof about the common axis.

15. The combination as claimed in claim 13 wherein the said levers are each adapted for movement to a neutral position in which the speed ratio control elements are each substantially held in their zero speed ratio position by means of the first levers irrespectively of the positions of the sliders on the levers.

16. The combination as claimed in claim 15 in which the levers are so arranged that the sliders may each move to a position intersecting the said common axis, the speed ratio control elements and the first links being so arranged that each speed ratio control element is held substantially in its zero speed ratio position when the associated slider moves to the said position on its lever intersecting the common axis.

17. The combination as claimed in claim 16 wherein the two levers are arranged in side by side relation and lie parallel to one another when both are in the neutral position, each of the said first links extending substantially at right angles to its lever when the lever is in the neutral position.

18. The combination as claimed in claim 17 wherein each second link extends substantially parallel to its associated lever when the lever is in the neutral position.

* * * * *